United States Patent [19]

Fernández

[11] 4,187,072

[45] Feb. 5, 1980

[54] GELLED NONPIGMENTED WOOD STAINS

[75] Inventor: Julio A. Fernández, Caledon, Canada

[73] Assignee: National Starch and Chemical Corporation, Bridgewater, N.J.

[21] Appl. No.: 969,690

[22] Filed: Dec. 14, 1978

[30] Foreign Application Priority Data

Apr. 14, 1978 [CA] Canada .................................. 301204

[51] Int. Cl.² .............................................. B27K 5/02
[52] U.S. Cl. ................................................ 8/6.5
[58] Field of Search .............................................. 8/6.5

[56] References Cited

U.S. PATENT DOCUMENTS

| 2,093,424 | 9/1937 | Dove | 8/6.5 |
|---|---|---|---|
| 2,806,759 | 9/1957 | Berglund | 8/6.5 |

*Primary Examiner*—Lewis T. Jacobs
*Attorney, Agent, or Firm*—Edwin M. Szala; Ellen T. Dec

[57] ABSTRACT

Nonpigmented aromatic alcohol based gelled wood stains are prepared from aniline dyestuffs, benzyl alcohol as solvent and dibenzylidene sorbitol as gellant therefor.

6 Claims, No Drawings

GELLED NONPIGMENTED WOOD STAINS

BACKGROUND OF THE INVENTION

1. Field of the Invention

This invention relates to nonpigmented aromatic alcohol-based wood stains. More particularly, the invention relates to nonpigmented aromatic alcohol based stains which are in gelled form.

2. Brief Description of the Prior Art

Stains for wood have conventionally been available in four forms: Pigment in oil, dye solutions—which utilize water as the solvent, dye solutions in which the solvents are petroleum hydrocarbons, and dye solutions which utilize aliphatic alcohols such as methyl, ethyl and isopropyl as the solvents singly or in combination with one or more such alcohols and/or glycol ethers such as Cellosolve [Trade Mark of Union Carbide].

Pigmented stains are only suitable for staining either low density open grain woods or rough woods. Such stains depend on the fiber structure of the wood being sufficiently open to allow the pigment particles to lodge. Where such is not possible as is the case with smooth sanded tight grained woods such as maple, the stain cannot be applied by the wipe on method but has to be laid on in the way of a paint in which case the opacity of the pigment greatly detracts from the overall appearance of the wood surface.

Furthermore, it becomes substantially more difficult to attain a furniture finish of factory quality, due to unevenness of brush application.

Stains consisting of dye solutions which utilize water as a solvent have good colour and are suitable on high density smooth woods; however, the water present in these stains raises the grain of the wood thereby necessitating additional sanding operation and may even result in the warping of thinner woods.

Stains consisting of dye solutions which utilize petroleum hydrocarbons as solvents, while not having the drawbacks of the aforementioned stains, have another drawback which is their tendency to bleed into the varnishes which are applied as top coats whenever these varnishes contain hydrocarbon solvents which are also capable of dissolving the dyes. Since the great majority of varnishes or wood top coats used by the public are of this type, such stains are not commonly available for home use.

Stains consisting of dye solutions which utilize aliphatic alcohols and/or glycol ether solvents as already mentioned do not have the draw backs of the previous three kinds of stains already mentioned, but present the home user or craftsman with problems of a different kind. The major problem in this respect is the difficulty of applying them evenly due to the extremely fast evaporation of the solvent, so that the only way to apply them uniformly is by spraying, a technique which requires equipment and skills not ordinarily available to the home refinisher or small scale industrial contractor.

(1) With the exception of the dye in water system, the other three contain toxic and/or flammable solvents providing yet another drawback to their use.

(2) Thus, of the above four systems only the pigment in oil stains have wide spread use in spite of their limitations, because they are easily used.

SUMMARY

It is therefore an object of the present disclosure to provide a stain having all the advantages of the aliphatic alcohol and/or glycol ether based stains of the prior art while being readily applicable by brushing or wiping.

It is also an object of the disclosure to provide a stain containing a non-flammable, substantially non-toxic solvent. It is a further object to provide a wood stain in gelled form.

In accordance with one aspect of the invention, there is provided, a gelled nonpigmented wood stain composition comprising:

(a) from 0.3 to 10% by weight of at least one soluble aniline dye;

(b) from 0.5 to 6% of dibenzylidene sorbitol; and (c) the remainder of the composition comprising benzyl alcohol, or benzyl alcohol with Cellosolve TM comprising up to 20% by weight of the benzyl alcohol;

In accordance with the second aspect of the invention, there is provided, a process for staining wood comprising applying thereto a gelled nonpigmented wood stain composition comprising:

(a) from 0.3 to 10% by weight of at least one soluble aniline dye;

(b) from 0.5 to 6% of dibenzylidene sorbitol; and (c) the remainder of the composition comprising benzyl alcohol, or benzyl alcohol with Cellosolve TM comprising up to 20% by weight of the benzyl alcohol.

The dibenzylidene sorbitol may have a gel strength within the range of $1 \times 10^6$ to $10 \times 10^6$ cps (preferably about $7 \times 10^6$ cps). Preferably, the dye may be present in an amount of about 3 to about 8% by weight.

The resultant stain is in a gelled semi-solid form and may be readily applied by brushing or wiping to any type of wood surface to produce a clear, transparent stained finish. The gelled stain is relatively slow in penetrating the wood and in drying so it may be applied to large surfaces and shaded as desired with no detectable unevenness or lap marks. Moreover, the gelled nature of the stain composition avoids many of the problems normally associated with dye containing stains such as spillage, necessity of carefully covering all working areas, etc.

An added advantage of wood surfaces stained with the stains here described is that they may be topcoated with such conventional materials as alkyl and urethane oil varnishes. Many of the stains used in prior art compositions either interfered with the adhesion of topcoats or were formulated with materials which caused the dyestuff to redissolve in the hydrocarbon solvent used in such topcoats. Additionally, the stain may be applied over previously stained and varnished surfaces in order to deepen the tone thereof without necessitating the removal of the varnish and without detracting from the appearance of the natural wood grain.

Furthermore, the use of benzyl alcohol as solvent for the stains avoids the problems of toxicity and flammability associated with prior art stain compositions.

DETAILED DESCRIPTION OF PREFERRED EMBODIMENTS OF THE INVENTION

Any of the conventional spirit soluble aniline dyes, (also known as coal tar dye stains) may be used in the present stain formulations. The most commonly employed of such dyes include the following: Walnut R, Golden Oak, Bismarch Brown, Black Nigrosine W.N., Green MX Crystals, Methylene Blue 2B, Fuchine Magenta R.T. and Violet 3BPN. These dyes are generally available under the Neozapon and Orasol tradenames from Badische Aniline and Soda-Fabrik and Ciba- Geigy respectively. Blends of one or more of the above with other benzyl alcohol soluble dyes may also be used. The total amount of dye employed will generally be within the range of 0.3 to 10%, preferably 3 to 8% by weight of the total formulation.

The exact chemical structure of the dibenzylidene sorbitol used as a gellant here is not known with certainty; it is, however, believed to be a mixture comprising a major proportion of dibenzylidene sorbitol with minor amounts of monobenzylidene sorbitol and tribenzylidene sorbitol. It may be prepared, for example, by adding benzaldehyde to an aqueous solution of sorbitol in an amount of 1 to 3 moles benzaldehyde per mole sorbitol. The reaction is carried out under acidic conditions whereby the pH is maintained at about 1 by the addition of, for example, sulfuric or phosphoric acid and the temperature at about 25° C. by cooling. The solid product is separated by filtration from the washed reaction mixture, washed with water and dried. Other methods of preparation will be apparent to those skilled in the art. Alternatively dibenzylidene sorbitol is supplied by New Japan Chemical Company under the tradename Gel All-D. The gellant is employed in quantities sufficient to produce a composition having a gel strength (measured on a Brookfield Helipath H) within the range of $1 \times 10^6$ to $10 \times 10^6$ cps., preferably about $7 \times 10^6$ cps, an optimum gel strength and viscosity for easy spreading and clean shipping and handling. The amount of gellant required to produce such viscosity will generally range from 0.5 to 6% by weight, preferably about 3.5% depending on such factors as the particular dyestuff employed, and solids concentration, etc.

The remainder of the composition is the solvent, benzyl alcohol (also known as styrolyl alcohol). In addition to its ability to dissolve the dyes employed, benzyl alcohol is a particularly satisfactory solvent due to its properties of low toxicity, flammability and volatility as well as being a non-irritant to the skin. Other solvents (e.g. ethyl alcohol and particularly Cellosolve TM) may be used in minor amounts less than about 20% by weight of the benzyl alcohol in addition to the benzyl alcohol in order to increase the drying time or lower the cost, however the use thereof will detract from other advantageous aspects of the instant compositions. Additionally, other additives conventionally employed in stain formulations (e.g. waxes) may also be added to the present compositions.

A composition also may be prepared from the gellant and the benzyl alcohol solvent. Such a composition is useful as a cleaner or, alternatively as a primer or as a shading compound. Thus, after application of the stain, the final tone may be lightened or further shaded by application of the gelled solvent. Alternatively, in the case where the end grain of the wood will be exposed (e.g. in raised panels on doors or intricately carbed surfaces) it has been found that application of the gelled solvent on such surfaces as a primer prior to staining will result in a uniform tone on all surfaces of the wood in contrast to the deeper stained tones normally present on such end grains.

The novel stain compositions here described are readily prepared by adding the desired amount of the gelling agent to a solution of the particular dye in the benzyl alcohol. In the most convenient method of preparation, the mixture is heated to effect solution and then naturally or force-cooled to gel. Alternatively, other methods for dispersing the mixture and forming the gel may be employed. If the heating method is used to produce the gel, the mixture may be packaged in the liquid form and allowed to gel in the particular packaging container. In this form, the stain may be stored for an indefinite period with no particular storage conditions required.

In order to apply, the gelled stain may be brushed or wiped onto the desired wood surface which has been preferably first treated with Danish Oil or other primer, shaded as desired and allowed to dry. Drying times on the order of about 4 to 7 hours should be allowed prior to any subsequent treatment of the surface, such as by top-coating.

In the following examples, all parts are by weight and all temperatures in degrees Celsius unless otherwise noted.

EXAMPLE I

This example illustrates a typical method for the preparation of a new gelled non-pigmented wood stain.

A maple dyestuff was prepared by combining 14 parts Neozapon Brown BE, 12 parts Orasol Brown 2GL and 4 parts Orasol Black RL. This dye was then dissolved in 935 parts benzyl alcohol and 35 parts dibenzylidene sorbitol (Gel All-D) added thereto. The mixture was heated to about 80° C. over a period of about 20 mins. poured into 16 oz. metal containers, covered and allowed to cool to room temperature. The resultant product had a viscosity of about $7 \times 10^6$ cps and produced a uniform, maple stain when applied to maple, oak, white ash and pine panels which had first been treated with a Danish Oil primer coating.

In a similar manner a cleaning and toning compound was prepared by mixing 965 parts of benzyl alcohol with 35 parts dibenzylidene sorbitol, heating to effect resolution, packaging and cooling.

EXAMPLE II

The procedure of Example I was repeated to produce a variety of wood stains. The particular dyestuffs and amounts employed are shown in Table I.

TABLE I

| Name | Parts Benzyl Alcohol | Parts Dibenzylidene Sorbitol | Dye | Dye | Dye |
|---|---|---|---|---|---|
| Brown Walnut | 917 | 35 | Orasol Brown 2GL 40 parts | Neozapon Brown BE 8 parts | |
| Reddish Walnut | 931 | 35 | Orasol Brown 2RG 32 parts | Neozapon Red BE 2 parts | |
| Brown Mahogany | 917 | 35 | Orasol Brown GR 40 parts | Neozapon Red BE 8 parts | |
| Red Mahogany | 885 | 35 | Orasol Brown GR | Neozapon Red BE | |

TABLE I-continued

| Name | Parts Benzyl Alcohol | Parts Dibenzylidene Sorbitol | Dye | Dye | Dye |
|---|---|---|---|---|---|
| Teak | 935 | 35 | 40 parts Orasol Brown 2GL | 40 parts Neozapon Yellow R | |
| Cherry | 930 | 35 | 27 parts Orasol Brown 2GL | 3 parts Neozapon Brown BE | Orasol Yellow 3R |
| | | | 20 parts | 5 parts | 10 parts |
| Ebony | 915 | 35 | Neozapon Black RE 50 parts | | |
| Rosewood | 901 | 35 | Orasol Brown 2 GL 60 parts | Orasol Red 2B 4 parts | |
| Oak | 935 | 35 | Neozapon Brown BE 30 parts | | |

EXAMPLE III

This example illustrates the specificity of dibenzylidene sorbitol as the gellant in the instant compositions.

The basic procedure employed in Example I was repeated using Gel All-D as gellent as well as using four commercially available Castor oil derived gellants. The gellants were added at varying levels and the gelling effectiveness of the various gellants was then measured in terms of viscosities in million centipoises (Brookfield Helipath B) for the less viscous formulations and as a gel strength in million centipoises (Brookfield Helipath H) for the relatively firmer gels. The results are shown in Table II.

TABLE II

| Gellant | Percent Gellant | | | |
|---|---|---|---|---|
| | 3.5 | 5 | 8 | 10 |
| Dibenzylidene Sorbitol | 7 (H) | 8.1 (H) | — | — |
| Thixatrol ST* | 0.17 (B) | 5 (H) | 6.3 (H) | 7 (H) |
| Thixcin R | 0.003 (B) | 0.003 (B) | 0.8 (H) | 0.9 (H) |
| Thixseal 1084 | 0.002 (B) | Incompatible | | |
| Thixseal 435 | Incompatible at all levels | | | |

*Excessive and permanent foam and air entrainment - can't be practically used or measured accurately. These compositions were all subject to syneresis resulting in a thin layer of solvent at the top of the container after prolonged storage.

As is seen from the results, the addition of only 3.5% dibenzylidene sorbitol gave over 40 times the gel strength of the Thixatrol ST. Moreover, the dibenzylidene sorbitol was the only gellant which produced a satisfactory formulation.

What is claimed is:

1. A gelled nonpigmented wood stain composition comprising:
    (a) from 0.3 to 10% by weight of at least one soluble aniline dye;
    (b) from 0.5 to 6% of dibenzylidene sorbitol; and
    (c) the remainder of the composition being selected from benzyl alcohol, and benzyl alcohol, with a solvent in an amount less than about 20% by weight of the benzyl alcohol and selected from ethyl alcohol and Cellosolve.
2. The composition of claim 1 wherein the dye is present in an amount of 3 to 8% by weight.
3. The composition of claim 1 wherein the dibenzylidene sorbitol is present in an amount sufficient to reduce a composition having a gel strength within the range of $1 \times 10^6$ to $10 \times 10^6$ cps.
4. The composition of claim 1 wherein the dibenzylidene sorbitol is present in an amount sufficient to produce a composition having a gel strength of about $7 \times 10^6$ cps.
5. A process for staining wood comprising applying thereto a gelled nonpigmented wood stain composition comprising:
    (a) from 0.3 to 10% by weight of at least one soluble aniline dye;
    (b) from 0.5 to 6% of dibenzylidene sorbitol; and
    (c) the remainder of the composition being selected from benzyl alcohol, and benzyl alcohol, with a solvent in an amount less than about 20% by weight of the benzyl alcohol and selected from ethyl alcohol and Cellosolve.
6. The composition of claim 1, wherein said remainder of the composition consists of benzyl alcohol and Cellosolve in an amount less than 20% by weight of the benzyl alcohol.

* * * * *